United States Patent
Gary

[11] Patent Number: 6,096,278
[45] Date of Patent: Aug. 1, 2000

[54] PROCESS AND DEVICE FOR TREATING GAS FLOWS

[75] Inventor: Daniel Gary, Montigny Le Bretonneux, France

[73] Assignee: L'Air Liquide, Societe Anonyme pour l'Etude et l'Exploitation des procedes Georges Claude, Paris Cedex, France

[21] Appl. No.: 09/108,405

[22] Filed: Jul. 1, 1998

[30] Foreign Application Priority Data

Jul. 4, 1997 [FR] France ................................ 97 08499

[51] Int. Cl.[7] ........................... C01B 13/20; C01B 21/04; C01B 23/00
[52] U.S. Cl. ............................ 423/239.1; 423/240 S; 423/244.06; 423/247; 423/248; 423/245.3; 423/262; 423/351
[58] Field of Search ........................... 423/219, 247, 423/248, 239.1, 240 S, 245.3, 244.06, 262, 351

[56] References Cited

U.S. PATENT DOCUMENTS

| | | | |
|---|---|---|---|
| 4,054,428 | 10/1977 | Foltz ............................ | 423/247 |
| 4,448,757 | 5/1984 | Barnwell ......................... | 423/247 |
| 5,110,569 | 5/1992 | Jain ............................. | 423/247 |
| 5,202,096 | 4/1993 | Jain ............................. | 423/248 |
| 5,401,477 | 3/1995 | Cawlfield et al. ................. | 423/605 |
| 5,685,172 | 11/1997 | Darredeau ........................ | 62/636 |

FOREIGN PATENT DOCUMENTS

| | | | |
|---|---|---|---|
| 2045060 | 1/1992 | Canada ........................... | 423/248 |
| 606081 | 7/1994 | European Pat. Off. ............... | 423/248 |
| 5-177115 | 7/1993 | Japan ............................ | 423/248 |

*Primary Examiner*—Steven P. Griffin
*Assistant Examiner*—Peter Di Mauro
*Attorney, Agent, or Firm*—Young & Thompson

[57] ABSTRACT

Process for purifying a gas flow with respect to at least one of the impurities capable of being oxidized and/or reduced which it contains, in which the gas flow is subjected to at least the following steps:

(a) compressing the gas flow to a pressure in excess of atmospheric pressure, (b) bringing the compressed gas flow into contact with at least a first bed of particles of a material containing at least one metal peroxide, and (c) bringing the gas flow resulting from step (b) into contact with at least a second bed of at least one catalyst.

14 Claims, 1 Drawing Sheet

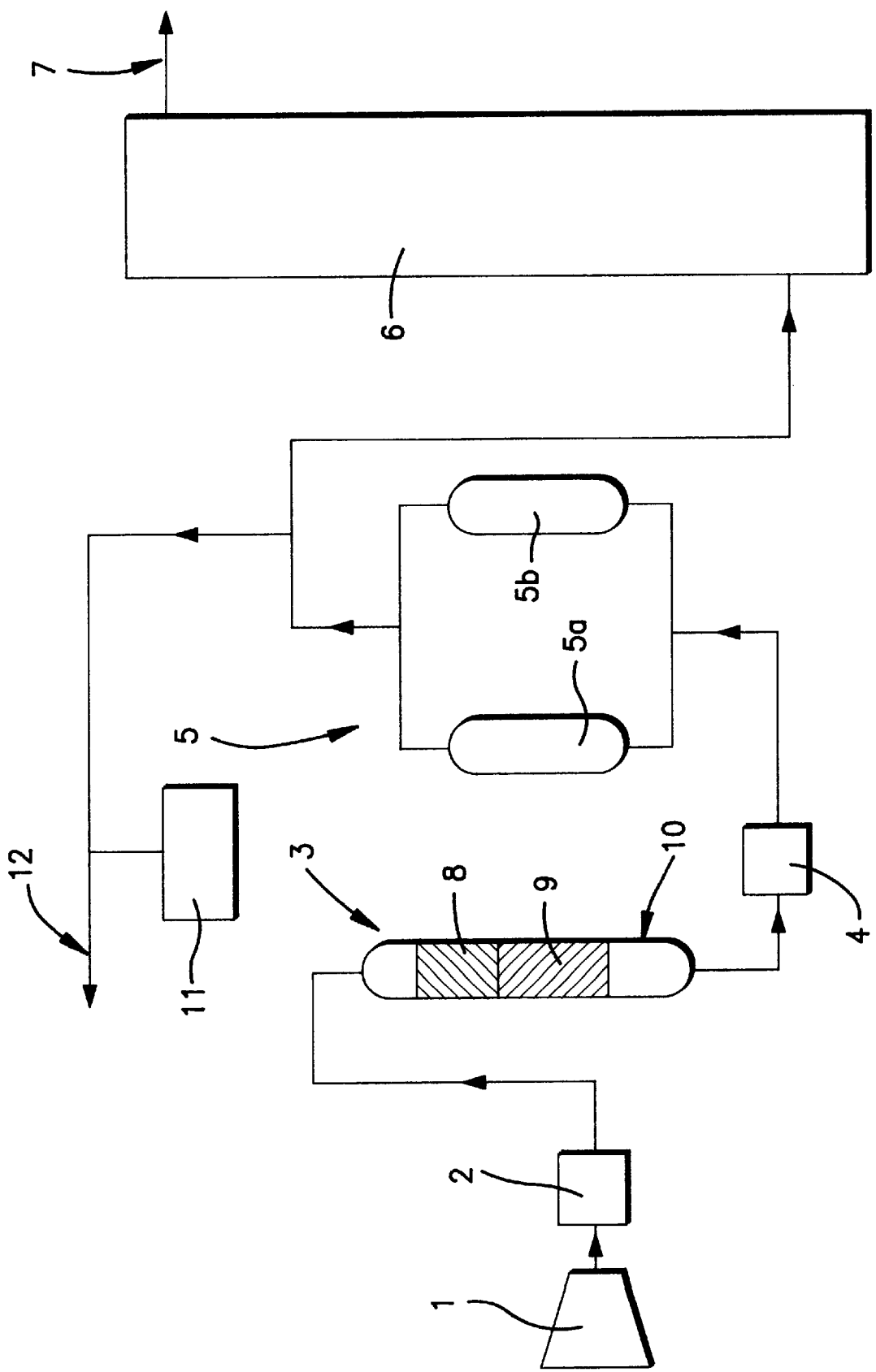

PROCESS AND DEVICE FOR TREATING GAS FLOWS

FIELD OF THE INVENTION

The present invention relates to a process and to a device for purifying gas flows, in particular ambient air, with respect to the impurities which may be found in them, the impurities being capable of undergoing catalytic oxidation and/or reduction.

BACKGROUND OF THE INVENTION

High-purity gases, such as the inert gases, find applications in many and varied sectors of industry. For example, high-purity nitrogen, also referred to as ultrapure nitrogen, is a fluid which is being used more and more in the electronics industry, in the liquid or gas state.

In general, ultrapure nitrogen intended for electronic purposes must be purified, that is to say rid of the impurities or pollutants which may be found in it, for example impurities such as: oxygen ($O_2$), carbon monoxide (CO), carbon dioxide ($CO_2$), hydrogen ($H_2$), water ($H_2O$), hydrocarbons, halogenated compounds, etc.

There are several processes for producing ultrapure nitrogen, the most common of which is that combining oxidative catalysis and cryogenic distillation of atmospheric air. According to this process, the atmospheric air is firstly compressed then heated, generally to a temperature in excess of 120° C., for example by means of heat exchangers such as heaters, before being subjected to oxidative catalysis, so as to oxidize the hydrogen ($H_2$) and the carbon monoxide (CO) which are found in it into water ($H_2O$) and carbon dioxide ($CO_2$) respectively; the water vapour and the carbon dioxide initially present in the air, and those formed by oxidative catalysis, being subsequently removed by adsorption, for example on an activated alumina bed or a zeolite bed.

It is in fact essential to remove beforehand the impurities such as CO and $H_2$ present in air, that is to say before cryogenic distillation because, by distillation, these impurities are difficult to separate and entail significant extra costs.

It is furthermore essential to remove the water vapour and the $CO_2$ found in air, before carrying out cryogenic distillation of the air, in order to eliminate any risk of plugging or clogging the cryogenic distillation columns with these two impurities which are insoluble at cryogenic temperature.

This pretreatment or purification of the air before distillation is referred to as "head purification" because it is upstream of the cryogenic distillation columns.

The air thus purified by catalysis and adsorption is subsequently sent to a cryogenic distillation column, at the outlet of which oxygen, on the one hand, and nitrogen, on the other hand, are recovered.

The nitrogen produced in this way may, if necessary, undergoes other purification steps in order to remove from it all the residual impurities contained therein and thus to meet the specifications required by the electronics industry, namely less than a few ppb (parts per billion by volume) of impurities.

Conventionally, a plant which is capable of implementing a nitrogen production process of this type is successively composed:

- of an air compressor making it possible to compress atmospheric air,
- optionally one or more heat exchangers intended to heat the air to a temperature compatible with the operation of the catalyst or catalysts, that is to say in general of the order of 80 to 150° C.,
- a catalytic purification zone comprising one or more catalytic oxidation reactors, containing one or more beds of catalysts operating at high temperature,
- one or more heat exchangers intended to cool the air, after passage through the catalytic purification zone, for example to ambient temperature,
- a drying/decarbonating zone intended to remove the impurities such as $CO_2$ and $H_2O$ from the air before cryogenic distillation,
- a cold box comprising, in particular, heat exchangers making it possible to cool the air to a cryogenic temperature, and a cryogenic distillation column intended to separate the air into its constituents nitrogen and oxygen,
- and means for recovering, in particular, the nitrogen produced in this way.

In general, the catalytic purification zone, operating at high temperature, permits efficient oxidation of the CO and $H_2$ found in the air into $CO_2$ and $H_2O$, respectively.

However, the intrinsic efficiency of the catalyst employed in this catalytic zone is intimately linked with the nature, that is to say the composition, of the atmospheric air at the site where the cryogenic distillation, and therefore the nitrogen production, are to be carried out.

In fact, although on a standard site the life of a catalyst may be several years, the same is not true on a heavily polluted site, such as a zone with high chemical or oil industry density, for example.

Thus, on certain high-activity industrial sites, very rapid deactivation of the oxidation catalyst has been observable, after only a few months of operation, leading to an almost 50% loss in activity of the catalyst and therefore to its premature replacement.

After an analysis of the atmospheric air, it was observed that it contained high proportions of pollutants which act as "poisons" for the oxidation catalyst and lead to a premature deactivation of it, which is even faster as the amount of the poisons contained in the air is high.

Furthermore, when, after a variable length of purification time, these poisons pass through the catalytic station, they may give rise to premature degradation of the performance of the head purification station located downstream, that is to say, for example, the zeolite bed used for this purpose.

"Poisons" of this type are, in particular, the halogen elements, such as chlorine, fluorine, bromine, etc., the acid gases, such as $SO_2$ and $NO_x$, and the oily vapours which may be released by the air compressor when this compressor is of the lubricated type.

The object of the present invention is therefore to improve the processes and devices for purifying gas flows, such as air, by solving the problem of premature deactivation or rapid poisoning of the oxidation or reduction catalysts used for purifying the gas flow.

SUMMARY OF THE INVENTION

The invention therefore relates to a process for purifying a gas flow with respect to at least one of the impurities capable of being oxidized and/or reduced which it contains, such as CO, $H_2$ and $O_2$, in which the gas flow is subjected to at least the following steps:

(a) compressing the gas flow to a pressure in excess of atmospheric pressure,
(b) bringing the compressed gas flow into contact with at least a first bed of particles of a material containing at least one metal peroxide, and (c) bringing the gas flow resulting from step (b) into contact with at least a second bed of at least one catalyst, such as an oxidation catalyst and/or a reduction catalyst.

Depending on the case, the process may comprise one or more of the following characteristics:

the first bed of particles furthermore contains at least one metal oxide;

the particles in the first bed comprise at least 15% by weight of metal peroxide and, preferably, at least 25% by weight of metal peroxide;

the particles in the first bed comprise metal oxides of at least two metals selected from the transition metals, namely, in particular, Ag, Cu, Mn and Au;

the particles in the first bed consist of at least one mixture comprising a copper oxide, a manganese oxide and a manganese peroxide;

at least step (b) is carried out on an undried gas flow at a temperature greater than or equal to 80° C. and, preferably, greater than or equal to 120° C., or even greater than or equal to 150° C.;

at least step (b) is carried out on a gas flow dried beforehand, at a temperature greater than or equal to 20° C., and preferably greater than or equal to 50° C.;

in step (a), the gas flow is compressed to a pressure of from $3.10^5$ Pa to $3.10^6$ Pa, preferably to a pressure of from $3.10^5$ Pa to $10^6$ Pa;

steps (b) and (c) are carried out successively and in the same reactor;

it includes, after step (c), a step of removing oxidized or reduced impurities contained in the gas flow;

it includes, when appropriate, after step (c), a step of cryogenically distilling the gas flow;

it furthermore includes a step of modifying the temperature of the gas flow by heating or by cooling.

the gas flow is air;

the gas flow is an inert gas to be recycled, such as nitrogen, argon, helium or mixtures thereof;

it furthermore includes a step of recovering at least one product selected from nitrogen, oxygen, argon and helium.

The invention also relates to a device for purifying a gas flow with respect to at least one of the impurities which it contains, including:

means for compressing the gas flow to a pressure in excess of atmospheric pressure, at least one catalytic zone containing at least one first bed of particles of a material containing at least one metal peroxide, and at least one second bed of at least one catalyst for oxidizing or reducing the impurities, the first bed being placed upstream of the second bed, and at least one purification zone for removing at least some of the oxidized or reduced impurities.

Depending on the case, the device of the invention may include, further to the heat exchanger means, at least one cryogenic distillation column and/or means for recovering at least one product leaving one or more cryogenic distillation columns.

BRIEF DESCRIPTION OF THE DRAWINGS

The invention will now be described in more detail with the aid of an embodiment presented on the single appended FIGURE, the embodiment being given by way of illustration but without implying any limitation.

The sole FIGURE represents a plant for producing nitrogen from atmospheric air.

DETAILED DESCRIPTION OF THE INVENTION

A flow of atmospheric air containing impurities such as CO, $H_2$, $CO_2$, $CH_4$, $H_2O$, $SO_2$, halogenated compounds and $NO_x$ is compressed by means of a compressor 1, heated to a temperature of the order of 160° C. by passage through heat exchangers 2, before being sent to a catalytic treatment zone 3, comprising a bottle 10 inside which a first bed 8 and a second bed 9 of particles are inserted; the first bed 8 being located on the inlet side and the second bed 9 on the outlet side of the bottle 10.

In this catalytic treatment zone 3, the air has a temperature of the order of 160° C. and has a pressure of about $7 \times 10^5$ Pa, and therefore passes successively through the first bed 8, then through the second bed 9 of particles.

More precisely, the first bed 8 is a guard bed, that is to say a pretreatment bed, including a material comprised of about 75% by a mixture of copper and manganese oxides, and of about 25% by weight of manganese peroxide. A material of this type is, in particular, marketed by the company SÜD CHEMIE under the reference N-140.

The first bed 8 therefore has the effect of protecting the subsequent catalytic bed by allowing removal of the halogenated species, the acid gases, the hydrocarbon vapours and the like which may be found in the gas flow to be purified.

For its part, the second bed 9 is formed by particles of catalysts consisting of metal, here palladium, which is deposited on a support, for example of the alumina type.

Since the first bed 8 is placed upstream of the second bed 9, the air to be purified, furthermore containing poisons for the catalyst, will undergo a pretreatment as it passes through the first bed 8, so that the poisons, such as the halogens, $SO_2$, $NO_x$ and oil vapours coming from the compressor 1, are retained by the first bed 8.

In other words, the first bed 8 serves to protect the second catalyst bed 9 located downstream, so that the latter can carry out its role fully and oxidize the oxidizable species contained in the air, such as CO and hydrogen, over a much longer period of time than when the air is not subjected to a pretreatment of this type.

After catalytic treatment, the air is successively sent to one or more heat exchangers 4, so as to cool the air to a temperature of less than 50° C., or even less than 0° C., then is sent to a purification zone 5 where the carbon dioxide ($CO_2$) and the water ($H_2O$) which have been formed by oxidizing the oxidizable species during the catalytic treatment are removed.

Preferably, the purification zone 5 comprises two bottles 5a and 5b, such as adsorbers, filled with a material making it possible to remove the aforementioned impurities, for example a zeolite, activated alumina or active carbon.

Advantageously, the two bottles 5a and 5b operate alternately, that is to say while bottle 5a is in the adsorption phase, bottle 5b is in the regeneration phase, and vice versa.

After purification, the air is sent to a cold box 6 including heat exchangers and one or more cryogenic distillation columns (not presented in detail).

When the fluid to be purified is not air, but for example a polluted inert gas which is to be recycled, such as impure nitrogen, helium or argon, it is not necessarily sent, after purification, to the cold box, but may be conveyed directly to a user site 12 (not presented in detail) and/or to a storage site 11.

At the outlet of the cold box, the nitrogen from the cryogenic distillation is recovered via recovering means 7, and this nitrogen may be used as it is or, where appropriate, may be subjected to other purification steps.

The provision of a bed of a material consisting of a mixture of metal oxides and peroxides upstream of the catalyst bed makes it possible, on the one hand, to increase significantly the life of the catalyst by providing it with protection against the poisons contained in the air to be purified by trapping and/or chemical reaction(s) and, on the other hand, has the advantage of not requiring any regeneration of the said catalytic treatment zone.

I claim:

1. Process for purifying an air flow with respect to at least one of the impurities which it contains, said impurities being selected from the group consisting of CO, $H_2$, $CH_4$, $SO_2$, $NO_x$ and halogenated compounds, in which the air flow is subjected to at least the following steps:

(a) compressing the air flow to a pressure in excess of atmospheric pressure so as to obtain a compressed air flow;

(b) contacting the compressed air flow with at least a first bed of particles comprising at least one mixture comprising a copper oxide, a manganese oxide, and a manganese peroxide, thereby eliminating at least one impurity selected from the group consisting of $SO_2$, $NO_x$ and halogenated compounds, said contacting being carried out at a temperature greater than or equal to 80° C.; and (c) bringing the air flow resulting from step (b) into contact with at least a second bed of at least one catalyst for oxidizing CO and one or several impurities selected from the group consisting of $H_2$ and $CH_4$ into $CO_2$ and $H_2O$.

2. The process according to claim 1, wherein the particles in the first bed comprise at least 15% by weight of manganese peroxide.

3. The process according to claim 2, wherein the particles in the first bed comprise at least 25% by weight of manganese peroxide.

4. The process according to claim 1, wherein the particles in the first bed comprise metal oxides of at least two metals selected from the transition metals.

5. The process according to claim 1, wherein at least step (b) is carried out at a temperature greater than or equal to 150° C.

6. The process according to claim 1, wherein at least step (b) is carried out on an air flow dried beforehand, at a temperature greater than or equal to 20° C.

7. The process according to claim 6, wherein at least step (b) is carried out on an air flow dried beforehand, at a temperature greater than or equal to 50° C.

8. The process according to claim 1, wherein in step (a), the air flow is compressed to a pressure of from $3 \times 10^5$ Pa to $3 \times 10^6$ Pa.

9. The process according to claim 8, wherein in step (a), the air flow is compressed to a pressure of from $3 \times 10^5$ Pa to $10^6$ Pa.

10. The process according to claim 1, wherein steps (b) and (c) are carried out successively and in the same reactor.

11. The process according to claim 1, further comprising a step of removing oxidized impurities contained in the air flow, after step (c).

12. The process according to claim 1, further comprising a step of cryogenically distilling the air flow, after step (c).

13. The process according to claim 1, further comprising a step of modifying the temperature of the air flow by heating or cooling.

14. The process according to claim 12, further comprising a step of recovering at least one product selected from the group consisting of nitrogen, helium, oxygen and argon.

* * * * *